(12) United States Patent
Huang et al.

(10) Patent No.: US 11,732,130 B2
(45) Date of Patent: Aug. 22, 2023

(54) FLAME RETARDANT IMPACT-MODIFIED POLYCARBONATE COMPOSITION

(71) Applicant: Covestro Intellectual Property GmbH & Co. KG, Leverkusen (DE)

(72) Inventors: Zhenyu Huang, Shanghai (CN); Hao Han, Shanghai (CN)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/777,086

(22) PCT Filed: Nov. 27, 2020

(86) PCT No.: PCT/EP2020/083602
§ 371 (c)(1),
(2) Date: May 16, 2022

(87) PCT Pub. No.: WO2021/110550
PCT Pub. Date: Jun. 10, 2021

(65) Prior Publication Data
US 2022/0363895 A1    Nov. 17, 2022

(30) Foreign Application Priority Data

Dec. 4, 2019   (WO) ............... PCT/CN2019/122906
Jan. 6, 2020   (EP) ..................... 20150305

(51) Int. Cl.
| C08L 69/00 | (2006.01) |
| C08K 5/5313 | (2006.01) |
| C08K 5/523 | (2006.01) |
| C08K 5/5333 | (2006.01) |
| C08L 53/02 | (2006.01) |
| C09K 21/14 | (2006.01) |
| C08K 5/521 | (2006.01) |

(52) U.S. Cl.
CPC .............. *C08L 69/00* (2013.01); *C08K 5/521* (2013.01); *C08K 5/5313* (2013.01); *C08K 5/5333* (2013.01); *C08L 53/025* (2013.01); *C09K 21/14* (2013.01)

(58) Field of Classification Search
None
See application file for complete search history.

(56) References Cited

U.S. PATENT DOCUMENTS

| 3,419,634 A | 12/1968 | Vaughn, Jr. |
| 3,644,574 A | 2/1972 | Winston et al. |
| 4,075,173 A | 2/1978 | Maruyama et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 5,672,645 A | 9/1997 | Eckel et al. |
| 5,994,463 A * | 11/1999 | Eckel ...................... C08L 51/04 264/331.21 |
| RE36,902 E | 10/2000 | Eckel et al. |
| 6,444,735 B1 * | 9/2002 | Eckel ...................... C08L 51/00 525/462 |
| 2012/0053265 A1 * | 3/2012 | Angell ................ C08K 5/5313 523/451 |
| 2014/0187688 A1 | 7/2014 | Jang et al. |
| 2022/0363895 A1 * | 11/2022 | Huang .................. C08L 53/025 |

FOREIGN PATENT DOCUMENTS

| CA | 1100681 A | 5/1981 |
| CA | 1173998 A | 9/1984 |
| CN | 106009038 A | 10/2016 |
| CN | 104086593 B | 4/2017 |
| CN | 108164955 A | 6/2018 |
| DE | 1495626 B1 | 6/1971 |
| DE | 2232877 A1 | 1/1974 |
| DE | 3832396 A1 | 2/1990 |
| EP | 0363608 A1 | 4/1990 |
| EP | 2955189 A1 | 12/2015 |
| GB | 1409275 A | 10/1975 |
| WO | 2018014443 A1 | 1/2018 |

OTHER PUBLICATIONS

BASF Melapur200 technical information (2012) pp. 1-2. (Year: 2012).*
Ullmanns, Enzyklopädie der Technischen Chemie, vol. 19 (1980), p. 280 et seq.
Ullmanns Enzyklopadie der technischen Chemie, vol. 18, pp. 301 ff. 1979.
Houben-Weyl, Methoden der organischen Chemie, vol. 12/1, p. 43; 1963.
Beilstein vol. 6, p. 177; 1943.
International Search Report, PCT/EP2020/083602, dated Mar. 4, 2021, Authorized officer: Stephane Bezard.

* cited by examiner

Primary Examiner — David J Buttner
(74) Attorney, Agent, or Firm — John E. Mrozinski, Jr.

(57) ABSTRACT

The present application relates to a flame retardant impact-modified polycarbonate composition and shaped parts as well as articles made therefrom. The polycarbonate composition comprises the following components: an aromatic polycarbonate, a rubber-modified vinyl (co)polymer, and a flame retardant combination. The shaped article made from the polycarbonate composition according to the present invention has a good balance among heat resistance, flame retardance and impact strength.

11 Claims, No Drawings

FLAME RETARDANT IMPACT-MODIFIED POLYCARBONATE COMPOSITION

CROSS REFERENCE TO RELATED APPLICATIONS

This application is a national stage application under 35 U.S.C. § 371 of PCT/EP2020/083602, filed Nov. 27, 2020, which claims benefit of European Application No. 20150305.9, filed Jan. 6, 2020, and Chinese Application No. PCT/CN2019/122906, filed Dec. 4, 2019, all of which are incorporated herein by reference in their entireties.

TECHNICAL FIELD

The present invention relates generally to a polycarbonate composition. In Particular, the present invention relates to a flame-retardant impact-modified polycarbonate composition.

BACKGROUND ART

Some traditional phosphorus flame retardant agents, such as bisphenol A bis(diphenyl phosphate) (BDP) and Resorcinol bis(diphenyl phosphate) (RDP), have been widely used for developing flame retardant polycarbonate (PC) blends including PC/ABS(Acrylonitrile-Butadien-Stylene) and PC/polyester blends. These phosphorus flame retardant agents are quite efficient to achieve desired flame retardant levels for most of applications, such as UL94 V0 and 5V ratings at a thickness of 1.5 mm. However, one obvious disadvantage of these flame retardant agents is that they tend to reduce VICAT softening temperature of PC blends dramatically within the normal loading 5-15 wt. %. For example, 1 wt. % of BDP will reduce VICAT temperature by 3-4° C. 10 wt. % of BDP, which is a regular loading in flame retardant PC/ABS system, will lead to a reduction of VICAT temperature by 30-40° C. This will limit the applications of these flame retardant PC/ABS materials especially for those applications where high power thus higher working temperature is required. At the same time, high loadings of phosphorus flame retardant agents in polycarbonate compositions will also have negative effect on mechanical properties such as impact performance.

To maintain heat resistance of flame retardant PC blends, some alternative flame retardant agents such as brominated ones (for example BC-52 from Lanxess) can be used. However, brominated flame retardant agents are not considered as ECO friendly and have been blocked in most of electronics and electrical, appliance applications especially for IT equipments. Therefore, ECO friendly (non-brominated, non-chlorinated) flame retardant solutions with improved heat resistance performance are always desired for the development of FR PC blend systems.

CN 104086593 B describes the preparation method of anew flame retardant agent based on 10-dihydro-9-oxa-10-phosphaphenanthrene-10-oxide (DOPO) derivative (DiDOPO). This flame retardant agent is claimed to give good thermal stability and chemical resistance and can be used with several thermoplastic and thermoset resins including polyethylene, polypropylene, ABS, HIPS (high impact polystylene), polycarbonate, PA (polyamide), polyester, epoxy resins and their blends etc.

CN106009038A describes a halogen free flame retardant blend containing .DOPO derivatives and nano silica or silico sol. This flame retardant package can be used for polycarbonate composition, which can achieve a UL94 V0 rating at a thickness of 1.5 mm.

CN108164955A describes a halogen-free flame retardant package used in polycarbonate composition. This flame retardant package contains DOPO and RDP. However, the polycarbonate compositions in this prior art can only achieve a UL94 V1 rating at a thickness of 1.6 mm.

Thus, an ECO friendly (non-brominated, non-chlorinated) flame retardant impact-modified polycarbonate composition with better balance of flame retardancy, heat resistance and impact resistance is still desired in the art.

SUMMARY OF THE INVENTION

The present invention aims to provide a polycarbonate composition with a good balance among heat resistance, flame retardance and impact strength.

It has now been found, surprisingly, that such an aim can be achieved by the polycarbonate composition according to the present application.

Thus, according to a first aspect, the present invention provides a flame-retardant impact-modified polycarbonate composition comprising, relative to the total weight of the polycarbonate composition:
  A) 50-90 wt. % of at least one aromatic polycarbonates,
  B) 3-15 wt. % of at least one rubber-modified vinyl (co)polymer,
  C) 5-17 wt. % of a flame retardant combination of i) a DiDOPO compound and ii) a monomeric and/or oligomeric phosphoric and/or phosphonic acid ester, wherein the DiDOPO compound represents from 10 wt. % to 90 wt. % of the flame retardant combination.

According to a second aspect, the present invention provides a shaped article made from the flame-retardant impact-modified polycarbonate composition according to the present invention.

According to a third aspect, the present invention provides a method for preparing the shaped article mentioned above, comprising injection moulding, extrusion moulding, blowing moulding process or thermoforming the polycarbonate composition according to the present invention.

The product made from the polycarbonate composition according to the present invention has a good balance among heat resistance, flame retardance and impact strength. It has potential applications in areas where require high power and working temperatures, including adaptor, charger, projector, network device, TV, notebook, etc.

Other subjects and characteristics, aspects and advantages of the present invention will emerge even more clearly on reading the description and the examples that follows.

DETAILED DESCRIPTION OF THE INVENTION

According to the first aspect, the present invention provides a flame-retardant impact-modified polycarbonate composition comprising, relative to the total weight of the polycarbonate composition:
  A) 50-90 wt. % of at least one aromatic polycarbonates,
  B) 3-15 wt. % of at least one rubber-modified vinyl (co)polymer,
  C) 5-17 wt. % of a flame retardant combination of i) a DiDOPO compound and ii) a monomeric and/or oligomeric phosphoric and/or phosphonic acid ester, wherein the DiDOPO compound represents from 10 wt. % to 90 wt. % of the flame retardant combination.

In that which follows and unless otherwise indicated, the limits of a range of values are included within this range, in particular in the expressions "of between" and "ranging from . . . to . . . ".

Moreover, the expression "at least one" used in the present description is equivalent to the expression "one or more".

Throughout the instant application, the term "comprising" is to be interpreted as encompassing all specifically mentioned features as well optional, additional, unspecified ones.

As used herein, the use of the term "comprising" also discloses the embodiment wherein no features other than the specifically mentioned features are present (i.e. "consisting of").

Unless defined otherwise, all technical and scientific terms used herein have the same meaning as commonly understand by one of ordinary skill in the art to which the present invention pertains. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about". Accordingly, unless indicated to the contrary, the numerical values and parameters described herein are approximate values which are capable of being changed according to the desired purpose as required.

Component A

According to the first aspect of the present invention, an aromatic polycarbonate is used in the polycarbonate composition as component A.

Suitable aromatic polycarbonates used according to the present invention are known from the literature or may be produced by processes known from the literature (for the production of aromatic polycarbonates see for example Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396.

Aromatic polycarbonates are produced e.g. by the melt process or by reaction of diphenols with carbonic acid halides, preferably phosgene and/or with aromatic dicarboxylic acid dihalides, preferably benzene dicarboxylic acid dihalides, by the phase interface process, optionally using chain stoppers, for example monophenols and optionally using trifunctional or more than trifunctional branching agents, for example triphenols or tetraphenols.

Diphenols for the production of the aromatic polycarbonates are preferably those of the formula (I)

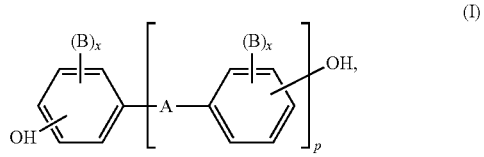

(I)

wherein

A is a single bond, $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene, onto which further aromatic rings, optionally containing heteroatoms, may be condensed, or a group of the formula (II) or (III)

(II)

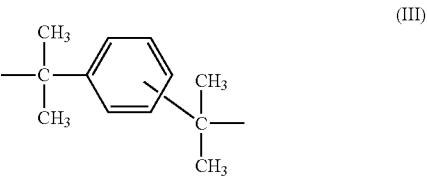

(III)

B is, in each case, $C_1$-$C_{12}$-alkyl, preferably methyl, x in each case, independently of each other, is 0, 1 or 2, p is 1 or 0, and $R^5$ and $R^6$ may be selected individually for each $X^1$, independently of each other, as hydrogen or $C_1$-$C_6$-alkyl, preferably hydrogen, methyl or ethyl, $X^1$ is carbon and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone. 2,2-bis-(4-hydroxyphenyl)-propane (bisphenol A) is preferred in particular.

The diphenols may be used individually, or in any mixture.

The diphenols are known from the literature or may be obtained by processes known from the literature.

Suitable chain stoppers for the production of the thermoplastic, aromatic polycarbonates are for example phenol, p-tert.-butyl phenol, but also long chain alkyl phenols such as 4-(1,3-tetramethylbutyl)-phenol according to DE-OS 2 842 005 or monoalkylphenol or dialkyl phenols containing a total of 8 to 20 C atoms in the alkyl substituents such as 3,5-di-tert.-butyl phenol, p-iso-octyl phenol, p-tert-octyl phenol, p-dodecyl phenol and 2-(3,5-dimethylheptyl)-phenol and 4-(3,5-dimethylheptyl)-phenol.

The quantity of chain stoppers to be used is generally 0.5 mol. % to 10 mol. %, in relation to the molar sum of the diphenols used in each case.

The thermoplastic, aromatic polycarbonates may be branched in the known way, and preferably by incorporating 0.05 to 2.0 mol. % in relation to the sum of the diphenols used, of trifunctional or more than trifunctional compounds, for example those having three or more phenolic groups.

Both homopolycarbonates and copolycarbonates are suitable. 1 to 25 wt. %, preferably 2.5 to 25 wt. % (in relation to the total quantity of diphenols to be used) of polydiorganosiloxanes with hydroxyaryloxy terminal groups may also be used for the production of copolycarbonates according to Component A of the invention. These are known (see for example U.S. Pat. No. 3,419,634) or may be produced by processes known from the literature. The production of copolycarbonates containing polydiorganosiloxanes is described e.g. in DE-A 3 334 782.

Preferred polycarbonates in addition to the bisphenol A homopolycarbonates are the copolycarbonates of bisphenol A containing up to 15 mol. % in relation to the molar sum of diphenols, of other diphenols.

Aromatic dicarboxylic acid dihalides for the production of aromatic polyestercarbonates are preferably the diacid dichlorides of isophthalic acid, terephthalic acid, diphenylether-4,4'-dicarboxylic acid and naphthaline-2,6-dicarboxylic acid.

Mixtures of diacid dichlorides of isophthalic acid and terephthalic acid in a ratio of 1:20 to 20:1 are preferred in particular.

When producing polyestercarbonates, a carbonic acid halide, preferably phosgene, is also used as a bifunctional acid derivative.

In addition to the monophenols already mentioned, their chlorocarbonic acid esters and the acid chlorides of aromatic monocarboxylic acids, which may optionally be substituted by $C_1$-$C_{22}$-alkyl groups, as well as aliphatic $C_2$-$C_{22}$ monocarboxylic acid chlorides are also possible chain stoppers for the production of the aromatic polyestercarbonates.

The quantity of chain stoppers is 0.1 to 10 mol. % in each case, in relation to mols of diphenols in the case of the phenolic chain stoppers, and to mols of dicarboxylic acid dichlorides in the case of the monocarboxylic acid chain stopper.

The aromatic polyestercarbonates may also have aromatic hydroxycarboxylic acids incorporated in them.

The aromatic polyestercarbonates may be either linear or branched in the known way (see also DE-A 2 940 024 and DE-A 3 007 934).

As branching agents it is possible to use e.g. trifunctional or polyfunctional carboxylic acid chlorides, such as trimesic acid trichloride, cyanuric acid trichloride, 3,3'-,4, 4'-benzophenone-tetracarboxylic acid tetrachloride, 1,4,5,8-naphthaline tetracarboxylic acid tetrachloride or pyromellitic acid tetrachloride, in quantities of 0.01 to 1.0 mol. % (in relation to the dicarboxylic acid dichlorides used) or trifunctional or polyfunctional phenols, such as phloroglucinol, 4,6-dimethyl-2,4,6-tri-(4-hydroxyphenyl)-heptene-2,4,4-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2, 6-bis (2-hydroxy-5-methyl-benzyl)-4-methyl-phenol, 2-(4-hydroxyphenyl)-2-(2,4-dihydroxyphenyl)-propane, tetra-(444-hydroxyphenyl sopropyl]-phenoxy)-methane, 1,4-bis[4,4'-dihydroxytriphenyl)-methyl-benzene, may be used as branching agents in quantities of 0.01 to 1.0 mol. % in relation to the diphenols used. Phenolic branching agents may be added with the diphenols.

Preferably, the aromatic polycarbonates used according to the present invention have a weight average molecular weight (Mw) of at least 10000 g/mol, preferably of 20000 g/mol to 300000 g/mol as determined by GPC in dichloromethane with polycarbonate as standard.

As examples of aromatic polycarbonate, mention can be made to Makrolon@2600 available from Covestro Polymers Co. Ltd, a linear bisphenol A polycarbonate, having a weight-average molecular weight of 26000 g/mol as determined by GPC in dichloromethane with polycarbonate as standard, and Makrolon FS2000, available from Covestro Polymers Co. Ltd, a linear bisphenol A polycarbonate, having a weight-average molecular weight of 20000 g/mol as determined by GPC in dichloromethane with polycarbonate as standard.

The thermoplastic aromatic polycarbonates may be used alone or in any mixture. Advantageously, the polycarbonate is present in the polycarbonate composition in amount ranging from 60 wt. % to 90 wt. %, preferably from 70 wt. % to 88 wt. 00 relative to the total weight of the polycarbonate composition.

Component B

According to the first aspect of the present invention, a rubber-modified vinyl (co)polymer is used in the polycarbonate composition as component B.

Preferably, the rubber-modified vinyl (co)polymer comprises,

B1) 5 to 95, preferably 8 to 90, in particular 20 to 85 wt. %, of at least one vinyl monomer on B2) 95 to 5, preferably 92 to 10, in particular 80 to 15 wt. %, of one or more graft bases having glass transition temperatures of <10° C., preferably <0° C., particularly preferably <-20° C., The wt. % is calculated based on the weight of the rubber-modified vinyl (co)polymer.

The glass transition temperature was determined by means of dynamic differential calorimetry (DSC) in accordance with the standard DIN EN 61006 at a heating rate of 10 K/min with definition of the $T_g$ as the midpoint temperature (tangent method).

The at least one vinyl monomer B1 are preferably mixtures of

B1.1) 50 to 99, preferably 65 to 85, in particular 75 to 80 wt. %, of vinylaromatics and/or vinylaromatics substituted on the nucleus (such as styrene, α-methylstyrene, p-methylstyrene) and/or methacrylic acid ($C_1$-$C_8$)-alkyl esters (such as methyl methacrylate, ethyl methacrylate) and B1.2) 1 to 50, preferably 15 to 35, in particular 20 to 25 wt. %, of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate, t-butyl acrylate, and/or derivatives (such as anhydrides and imides) of unsaturated carboxylic acids, for example maleic anhydride and N-phenyl-maleimide, The wt. % is calculated based on the weight of the vinyl monomer B1.

Preferred monomer B1.1 is chosen from monomers styrene, α-methylstyrene and methyl methacrylate. Preferred monomer B1.2 is chosen from monomers acrylonitrile, maleic anhydride and methyl methacrylate. More preferably, monomer B1.1 is styrene and monomer B1.2 is acrylonitrile.

As examples of the graft base B2, mention can be made of, diene rubbers, EP(D)M rubbers, that is to say those based on ethylene/propylene and optionally diene, and acrylate, polyurethane, silicone, and ethylene/vinyl acetate rubbers and silicone/acrylate composite rubbers.

Preferred graft base B2 is chosen from diene rubbers, for example based on butadiene and isoprene, or mixtures of diene rubbers or copolymers of diene rubbers or mixtures thereof with further copolymerizable monomers (e.g. according to B1.1 and B1.2), with the proviso that the glass transition temperature of component B2 is below <10° C., preferably <0° C., particularly preferably <-20° C.

Pure polybutadiene rubber is particularly preferred as the graft base B2.

Particularly preferred rubber-modified vinyl (co)polymers are for example, ABS or MBS polymers, such as are described e.g. in DE-OS 2 035 390 (=U.S. Pat. No. 3,644, 574) or in DE-OS 2 248 242 (=GB 1 409 275) and in Ullmanns, Enzyklopadie der Technischen Chemie, vol. 19 (1980), p. 280 et seq.

As an example of rubber-modified vinyl (co)polymer can be used in the present invention, mention can be made to ABS 8391 available from SINOPEC Shanghai Gaoqiao Company having a polybutadiene rubber content of 10-15 wt. % based on the ABS polymer, and ABS HRG powder P60 available from Styrolution, produced by emulsion polymerisation of 42-45 wt. %, based on the ABS polymer, of a mixture of 27 wt. % acrylonitrile and 73 wt. % styrene in the presence of 55-58 wt. %, based on the ABS polymer, of a crosslinked polybutadiene rubber (the average particle diameter $d_{50}$-0.3 μm).

The rubber-modified vinyl (co)polymers can be prepared by free radical polymerization, e.g. by emulsion, suspension, solution or bulk polymerization, preferably by emulsion or bulk polymerization, in particular by emulsion polymerization.

Advantageously, the rubber-modified vinyl (co)polymer is present in the polycarbonate composition in amount ranging from 4 wt. % to 10 wt. %, preferably from 5 wt. % to 9 wt. %, relative to the total weight of the polycarbonate composition.

Component C

According to the first aspect of the present invention, a flame retardant combination of i) a DiDOPO compound and ii) a monomeric and/or oligomeric phosphoric and/or phosphonic acid ester is used in the polycarbonate composition as component C.

The DiDOPO compound preferably used in the polycarbonate composition has a structure represented by formula (IV).

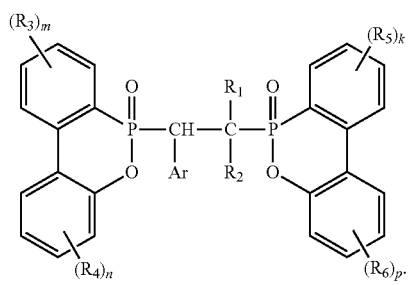

wherein

Ar denotes $C_3$-$C_{18}$ heteroaryl or $C_6$-$C_{18}$ aryl;

$R_1$ and $R_2$, independently of one another, denote hydrogen, $C_1$-$C_{18}$ alkyl, $C_3$-$C_{18}$ heteroaryl or $C_6$-$C_{18}$ aryl;

$R_3$, $R_4$, $R_5$ and $R_6$, independently of one another, denote hydrogen, $C_1$-$C_{18}$ alkyl, $C_3$-$C_{18}$ heteroaryl or $C_6$-$C_{18}$ aryl;

m, n, k, and p individually selectable from 0, 1, 2, 3, 4;

any hydrogen atom on the aryl or heteroaryl aromatic ring can be independently replaced by any $C_1$-$C_{18}$ alkyl group.

As an example of the DiDOPO compound, mention can be made to HTP-6123G, which is produced by GUIZHOU YUANYI MINING GROUP CO. It is a halogen free flame retardant and has high melting point (170° C.-180° C.).

The monomeric and/or oligomeric phosphoric and/or phosphonic acid ester preferably used in the polycarbonate composition has a structure represented by formula (V):

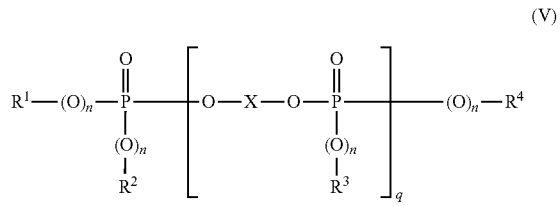

wherein $R^1$, $R^2$, $R^3$ and $R^4$, independently of one another, denote $C_1$-$C_8$ alkyl, $C_5$-$C_6$ cycloalkyl, $C_6$-$C_{20}$ aryl or $C_7$-$C_{12}$ aralkyl each optionally substituted by alkyl, preferably $C_1$-$C_4$ alkyl, n independently of one another, denotes 0 or 1, q denotes a number ranging from 0 to 30, and X denotes a mononuclear or polynuclear aromatic residue with 6 to 30 C atoms or a linear or branched aliphatic residue with 2 to 30 C atoms, which optionally being OH-substituted and containing up to eight ether bonds.

$R^1$, $R^2$, $R^3$ and $R^4$, independently of one another, preferably denote $C_1$-$C_4$ alkyl, phenyl, naphthyl or phenyl $C_1$-$C_4$ alkyl. The aromatic groups $R^1$, $R^2$, $R^3$ and $R^4$ can themselves be substituted with alkyl groups, preferably $C_1$-$C_4$ alkyl. Particularly preferred aryl residues are cresyl, phenyl, xylenyl, propylphenyl or butylphenyl.

X in formula (V) preferably signifies a mononuclear or polynuclear aromatic residue with 6 to 30 C atoms. This is preferably derived from diphenols of formula (I).

n in formula (V) can, independently of one another, be 0 or 1; n is preferably equal to 1. q denotes all numbers ranging from 0 to 30, preferably 0 to 20, particularly preferably 0 to 10, and in the case of mixtures average values from 0.8 to 5.0, preferably 1.0 to 3.0, more preferably 1.05 to 2.00, and particularly preferably from 1.08 to 1.60.

X, in particular, is derived from resorcinol, hydroquinone, bisphenol A or diphenylphenol. Particularly preferably, X is derived from bisphenol A.

Phosphorus compounds of formula (V) are in particular tributyl phosphate, triphenyl phosphate, tricresyl phosphate, diphenyl cresyl phosphate, diphenyl octyl phosphate, diphenyl-2-ethylcresyl phosphate, tri(isopropylphenyl)phosphate, resorcinol bridged oligophosphate and bisphenol A bridged oligophosphate. The use of oligomeric phosphoric acid esters of formula (V) derived from bisphenol A is particularly preferred.

Most preferred is bisphenol A based oligophosphate according to formula (VI) and (VII).

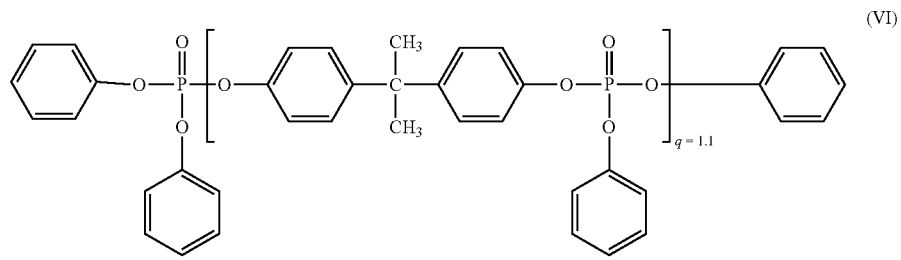

-continued

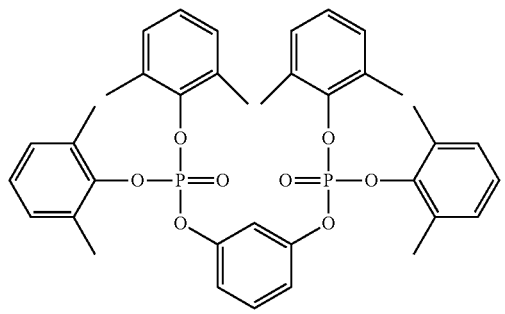

(VII)

The phosphorus compounds can be used as component C are known (cf. e.g. EP-A 0 363 608, EP-A 0 640 655) or can be produced by known methods in an analogous manner (e.g. Ullmanns Enzyklopadie der technischen Chemie, vol. 18, pp. 301 ff 1979; Houben-Weyl, Methoden der organischen Chemie, vol. 12/1, p. 43; Beilstein vol. 6, p. 177).

Advantageously, the flame retardant combination is present in the polycarbonate composition in amount ranging from 6 wt. % to 15 wt. %, preferably from 7 wt. % to 12 wt. %, relative to the total weight of the polycarbonate composition.

Preferably, the DiDOPO compound represents from 15 wt. % to 80 wt. % of the flame retardant combination.

Component D

According to an embodiment, the polycarbonate composition of the present invention comprises a rubber-free vinyl copolymer as component D.

The rubber-free vinyl copolymer is a vinyl copolymer made of

D1) from 65 to 85% by weight, preferably from 70 to 80% by weight, in particular from 74 to 78% by weight, based in each case on the rubber-free vinyl copolymer, of at least one monomer selected from the group of the vinyl aromatics (for example styrene, α-methylstyrene) and ring-substituted vinyl aromatics (for example p-methylstyrene), and D2) from 15 to 35% by weight, preferably from 20 to 30% by weight, in particular from 22 to 26% by weight, based in each case on the rubber-free vinyl copolymer, of at least one monomer selected from the group of the vinyl cyanides (for example unsaturated nitriles such as acrylonitrile and methacrylonitrile), ($C_1$-$C_5$)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleinimide).

Particular preference is given to a rubber-free copolymer of styrene (D1) and acrylonitrile (D2) as component D.

These copolymers are known and can be produced by free-radical polymerization, in particular by emulsion, suspension, solution or bulk polymerization.

The average molar masses $M_w$ (determined by gel permeation chromatography into tetrahydrofuran with polystyrene as standard) of the copolymers are preferably from 15 000 to 250 000 g/mol, with preference from 50 000 to 160 000 g/mol, in particular from 80 000 to 140 000 g/mol.

Component D used can comprise a vinyl copolymer or a mixture of a plurality of vinyl copolymers according to the description above.

As an example of rubber-free vinyl copolymer can be used in the present invention, mention can be made to SAN DN50, a styrene-acrylonitrile copolymer of 77 wt. % styrene and 23 wt. % acrylonitrile with a weight average molecular weight Mw of 130000 g/mol (determined by GPC).

The inventors have found that with the addition of the rubber-free vinyl copolymer, the flowability of the obtained composition was further improved, while the flame retardancy will be adversely impacted slightly, Advantageously, the rubber-free vinyl copolymer is present in the polycarbonate composition in amount ranging from 4 wt. % to 8 wt. %, preferably from 4 wt. % to 6 wt. %, relative to the total weight of the polycarbonate composition.

Preferably, when the total amount of the rubber-modified vinyl (co)polymer and the rubber-free vinyl copolymer is from 5 wt. % to 10 wt. %, the total amount of the flame retardant combination of i) a DiDOPO compound and ii) a monomeric and/or oligomeric phosphoric and/or phosphonic acid ester ranges from 4 wt. % to 9 wt. %, relative to the total weight of the polycarbonate composition, wherein the DiDOPO compound represents 20 wt. % to 80 wt. % of the flame retardant combination.

Preferably, when the total amount of the rubber-modified vinyl (co)polymer and the rubber-free vinyl copolymer is from 10 wt. % to 15 wt. %, the total amount of the flame retardant combination of i) a DiDOPO compound and ii) a monomeric and/or oligomeric phosphoric and/or phosphonic acid ester ranges from 9 wt. % to 14 wt. %, relative to the total weight of the polycarbonate composition, wherein the DiDOPO compound represents 10 wt. % to 60 wt. % of the flame retardant combination.

Additives

The polycarbonate composition according to the present invention may further comprise one or more additives as component E.

Preferably, the additive is selected from antidripping agents (for example compounds from the substance classes of fluorinated polyolefins, for example PTFE), internal and external lubricants and mould release agents (for example pentaerythritol tetrastearate, montan wax or polyethylene wax), flowability auxiliary agents, antistatic agents, conductivity additives, stabilizers (for example UV/light stabilizers, heat stabilizers, antioxidants, agents which prevent hydrolysis), additives for improve scratch resistance (for example silicone oils), IR absorbents, optical brighteners, fluorescent additives, and dyestuffs and pigments (for example carbon black, titanium dioxide or iron oxide), or mixtures thereof.

The polycarbonate composition according to the present invention particularly preferably contains at least one mould release agent, preferably pentaerythritol tetrastearate.

The skilled in the art can adjust the amount of the additives as desired.

In an embodiment, the polycarbonate composition according to the present invention comprises 0.1-2 wt. % of an antidripping agent, relative to the total weight of the polycarbonate composition.

In some preferred embodiments, the present invention provides a flame-retardant impact-modified polycarbonate composition comprising, relative to the total weight of the polycarbonate composition:

A) 80-90 wt. % of at least one aromatic polycarbonates,
B) 5-10 wt. % of at least one rubber-modified vinyl (co)polymer,
C) 4-9 wt. % of a flame retardant combination of i) a DiDOPO compound and ii) a monomeric and/or oligomeric phosphoric and/or phosphonic acid ester, wherein the DiDOPO compound represents from 20 wt. % to 80 wt. % of the flame retardant combination.

In some preferred embodiments, the present invention provides a flame-retardant impact-modified polycarbonate composition comprising, relative to the total weight of the polycarbonate composition:
A) 70-80 wt. % of at least one aromatic polycarbonates,
B) 5-10 wt. % of at least one rubber-modified vinyl (co)polymer,
C) 9-14 wt. % of a flame retardant combination of i) a DiDOPO compound and ii) a monomeric and/or oligomeric phosphoric and/or phosphonic acid ester, wherein the DiDOPO compound represents from 10 wt. % to 60 wt. % of the flame retardant combination;
D) 3-6 wt. % of a rubber-free vinyl copolymer.

The flame-retardant polycarbonate composition according to the present invention can be prepared by a variety of methods involving intimate admixing of the materials desired in the polycarbonate composition.

For example, the materials desired in the polycarbonate composition are first blended in a high speed mixer. Other low shear processes, including but not limited to hand mixing, can also accomplish this blending. The blend is then fed into the throat of a twin-screw extruder via a hopper. Alternatively, at least one of the components can be incorporated into the polycarbonate composition by feeding directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include: co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 230° C. and 330° C. in the molten polycarbonate composition, although higher temperatures can be used provided that the residence time of the resin in the processing equipment is kept short.

In some embodiments, the melt processed composition exits processing equipment such as an extruder through small exit holes in a die. The resulting strands of the molten resin are cooled by passing the strands through a water bath. The cooled strands can be cut into small pellets for packaging and further handling.

The polycarbonate composition according to the present invention can be used, for example for the production of all types of shaped articles.

Thus, according to the second aspect, the present invention provides a shaped article made from the flame-retardant polycarbonate composition according to the first aspect of the present invention.

The flame-retardant polycarbonate composition according to the present invention can be molded into useful shaped articles such as, a part for adaptor, charger, projector, network device, TV, notebook, etc.

The shaped article can be in any shape as desired.

The flame-retardant polycarbonate composition according to the present invention is particularly suitable for the production of thin-walled housing parts in the electrical and electronics areas.

According to the third aspect, the present invention provides a method for preparing the shaped article mentioned above, comprising injection moulding, extrusion moulding, blowing moulding process or thermoforming the polycarbonate composition according to the present invention.

All percentages in the present invention refer to weight percentage, unless otherwise specified.

The examples that follow are aimed at illustrating the present invention, but are not in any way a limitation of the scope thereof.

EXAMPLES

Materials Used
Component A
Makrolon® 2600, a linear polycarbonate based on bisphenol A with a weight average molecular weight Mw of 26000 g/mol (determined by GPC in dichloromethane with polycarbonate as standard), available from Covestro Polymers (China) Co. Ltd.

Component B1
ABS high rubber grafted (HRG) polymer powder P60 from Styrolution with core-shell structure, produced by emulsion polymerisation of 42-45 wt. %, based on the ABS polymer, of a mixture of 27 wt. % acrylonitrile and 73 wt. % styrene in the presence of 55-58 wt. %, based on the ABS polymer, of a crosslinked polybutadiene rubber.

Component B2
ABS 8391 from SINOPEC Shanghai Gaoqiao Company produced by bulk polymerisation and has a polybutadiene rubber content of 10-15 wt. % based on the ABS polymer.

Component C1
HTP-6123G, a DiDOPO type flame retardant, available from Guizhou Yuanyi Mining Group Co.

Component C2
Bisphenol A bis(diphenyl phosphate), available from Zhejiang Wansheng Chemical Co., Ltd.

Component C3
PX200, [1,3-phenylene-tetrakis (2,6-dimethylphenyl) phosphate], available from DAIHACHI CHEMICAL INDUSTRY CO., LTD.

Component D
SAN DN50, a styrene-acrylonitrile copolymer of 77 wt. % styrene and 23 wt. % acrylonitrile with a weight average molecular weight Mw of 130000 g/mol (determined by GPC), produced by the bulk process, available from Styrolution.

Component E1
FS200, an anti-dripping agent, polytetrafluoroethylene (PTFE) capped by SAN masterbatch, available from Han Nanotech Co., Ltd.

Component E2
Pentaerythritol Tetrastearate, used as lubricant/mould agent.

Component E3
Irganox® B900, a phosphite stabilizer, which is a mixture of Irgafos® 168 (tris(2,4-di-tert-butylphenyl)phosphite) and 20% Irganox® 1076 (2,6-di-tert-butyl-4-(octadecanoxycarbonylethyl)phenol), available from BASF AG, Ludwigshafen, Germany.

Measurements
The following properties were used in the present application.

The notched impact strength was measured at 23° C. (4 mm, 5.5 J) in accordance with ISO 180/1A:2000 on a notched single gated specimen with dimensions of 80×10×4 mm.

The burning behaviour was evaluated in accordance with UL 94: 2013 on specimens with dimensions of 127×12.7×1.5 mm, 127×12.7×1.2 mm, 127×12.7×1.0 mm after conditioning at 23° C. for 2 days.

The Vicat softening temperature is determined (50N; 120K/h) in accordance with ISO 306: 2013 on bars of dimensions 80×10×4 mm.

Inventive Examples 1-7 and Comparative Examples 1-6

The flame-retardant impact-modified polycarbonate compositions of inventive examples 1-7 (IE1-IE7) and comparative examples 1-6 (CE1-CE6) containing the components as shown in Tables 1-3 were prepared in the form of granules on a ZSK25 twin-screw extruder from Coperion, Werner and Pfleiderer (Germany) at a speed of 225 rpm and at a machine temperature of 260° C., with a throughput of 20 kg/h.

Test bars of dimensions 80 mm× 10 mm×4 mm, 127 mm×12.7 mm×1.5 mm, 127 mm×12.7 mm×1.2 mm and 127 mm×12.7 mm×1.0 mm were prepared on the injection moulding machine with a melt temperature of 240° C., a mould temperature of 80° C., a flow front velocity of 240 mm/s with the granules obtained for each composition.

The Izod notched impact strength, Vicat softening temperature, burning behaviour of the bars were characterized and the results were summarized in Tables 1-3.

TABLE 1

The inventive examples (IE1-IE3) and the comparative examples (CE1-CE2)

| | | Components | CE1 | IE1 | IE2 | IE3 | CE2 |
|---|---|---|---|---|---|---|---|
| A | | Polycarbonate | 76.3 | 76.3 | 76.3 | 76.3 | 76.3 |
| B1 | | ABS P60 | 7.7 | 7.7 | 7.7 | 7.7 | 7.7 |
| D | | SAN DN50 | 4.7 | 4.7 | 4.7 | 4.7 | 4.7 |
| C1 | | HTP-6123G | | 1.5 | 2.5 | 5.0 | 10.0 |
| C2 | | BDP | 10.0 | 8.5 | 7.5 | 5.0 | |
| E1 | | PTFE MB | 0.8 | 0.8 | 0.8 | 0.8 | 0.8 |
| E2 | | PETS | 0.4 | 0.4 | 0.4 | 0.4 | 0.4 |
| E3 | | B900 | 0.1 | 0.1 | 0.1 | 0.1 | 0.1 |
| Properties | | Units | | | | | |
| Izod notched impact strength | | kJ/m$^2$ | 49 | 49 | 49 | 49 | 47 |
| Vicat softening temperature | | ° C. | 111 | 112 | 114 | 118 | 126 |
| Burning | 1.5 mm | Class | V1 | V0 | V0 | V0 | V1 |
| behaviour | 1.2 mm | Class | V1 | V0 | V1 | V1 | V2 |
| | 1.0 mm | Class | Fail | V2 | V2 | V2 | V2 |

According to Table 1, the combination of ABS and SAN is used with a total amount of 12.4 wt. % and the combination of HTP-6123G and BDP was used with a total amount of 10 wt. % for inventive compositions IE1-IE3. In inventive examples IE1-IE3, the combination of HTP-6123G and BDP with different weight ratios was used.

As showed in Table 1, the VICAT softening temperature was increased significantly with the increase of the amount of HTP-6123G in the flame retardant combination for inventive examples IE1-IE3.

Surprisingly, the synergy between BDP and HTP-6123G was observed in terms of flame retardant performance. As can be seen from comparative composition CE1, with the addition of 10 wt. % BDP without HTP-6123G, only V1 rating can be achieved at the thicknesses of 1.5 mm and 1.2 mm. Meanwhile, as can be seen from inventive example IE1, the combination of 1.5 wt. % of HTP-6123G and 8.5 wt. % of BDP dramatically improved the flame retardant performance to the level of V0 rating at the thicknesses of 1.5 mm and 1.2 mm (IE1). Compared to comparative composition CE1, the combination of 2.5 wt. % of http-6123G and 7.5 wt. % of BDP (IE2) and the combination of 5.0 wt. % of BDP and 5.0 wt. % of HTP-6123G (IE3) also resulted in improved FR performance and a V0 rating at the thickness of 1.5 mm was achieved. However, when only HTP-6123G was used in comparative compostions CE2, it was found that there was no improvement on flame retardant performance.

As compared with comparative example CE1, the impact strength was not adversely affected when the combination of HTP-6123G and BDP was used in the inventive examples IE1-IE3.

TABLE 2

Compartive exmaple 3 (CE3) and inventive examples 4-7 (IE4-IE7)

| | Components | CE3 | IE4 | IE5 | IE6 | IE7 |
|---|---|---|---|---|---|---|
| A | Polycarbonate | 84.0 | 84.0 | 84.0 | 84.0 | 84.0 |
| B1 | ABS P60 | 3.3 | 3.3 | 3.3 | 3.3 | 3.3 |
| B2 | ABS 8391 | 4.4 | 4.4 | 4.4 | 4.4 | 4.4 |
| C1 | HTP-6123G | | 3.5 | 1.5 | 3.5 | 5.5 |
| C2 | BDP | 7.0 | 3.5 | | | |
| C3 | PX-200 | | | 5.5 | 3.5 | 1.5 |
| E1 | PTFE MB | 0.8 | 0.8 | 0.8 | 0.8 | 0.8 |
| E2 | PETS | 0.4 | 0.4 | 0.4 | 0.4 | 0.4 |
| E3 | B900 | 0.1 | 0.1 | 0.1 | 0.1 | 0.1 |
| Properties | Units | | | | | |
| Izod notched impact strength | kJ/m$^2$ | 9.9 | 12 | 16 | 17 | 16 |
| Vicat softening temperature | °C. | 120 | 126 | 122 | 125 | 127 |
| Burning   1.5 mm | Class | V0 | V0 | V0 | V0 | V0 |
| behaviour  1.2 mm | Class | V1 | V0 | V0 | V0 | V0 |
|             1.0 mm | Class | V2 | V0 | V1 | V1 | V0 |

According to Table 2, the similar synergy between BDP and DIDOPO is further demonstrated by the comparison of CE3 and IE4. By using a 50:50 weight ratio of BDP and HTP-6123G, the FR performance can be improved from a UL94 V0 rating at the thickness of 1.5 mm to a UL94 V0 rating at the thickness of 1.0 mm. The similar synergy between another phosphorus FR agent PX-200 and HTP-6123G is also observed (IE5-IE7). In the case of PX-200, the significantly improved VICAT temperature of the polycarbonate composition is also observed when PX-200 is gradually replaced by HTP-6123G from IE5 to IE7. When the weight ratio of PX-200 to HTP-6123G is 1.5:5.5, the FR performance can achieve a UL94 V0 rating at the thickness of 1.0 mm.

TABLE 3

The comparative examples (CE4-CE6)

| | Components | CE4 | CE5 | CE6 |
|---|---|---|---|---|
| A | Polycarbonate | 64.7 | 64.7 | 64.7 |
| B1 | ABS P60 | 3.0 | 3.0 | 3.0 |
| B2 | ABS 8391 | 16.0 | 16.0 | 16.0 |
| C1 | DIDOPO | 5.0 | 10.0 | 15.0 |
| C2 | BDP | 10.0 | 5.0 | |
| E1 | FS200 (PTFE MB) | 0.8 | 0.8 | 0.8 |
| E2 | PETS | 0.4 | 0.4 | 0.4 |
| E3 | B900 | 0.1 | 0.1 | 0.1 |
| Properties | Units | | | |
| Izod notched impact strength | kJ/m$^2$ | 10 | 10 | 8.9 |
| Vicat softening temperature | °C. | 103 | 110 | 117 |
| Burning   1.5 mm | Class | V2 | V2 | V2 |
| behaviour 1.2 mm | Class | V2 | V2 | V2 |

It can be seen from Table 3 that when the content of impact modifiers (ABS P60 and ABS8391) is increased to 19 wt. %, the combination of FR agents BDP and HTP-6123G in the polycarbonate compositions could not achieve UL 94 V0 rating even at the thickness of 1.5 mm. CE4 and CE5 clearly demonstrate that the synergetic effect between BDP and HTP-6123G cannot be achieved at a high content of ABS. Furthermore, the use of pure HTP-6123G in CE6 also does not benefit the flame retardant performance.

In summary, without sacrificing other properties, the synergetic effect regarding flame retardant performance can be identified by using the combination of HTP-6123G and BDP or the combination of HTP-6123G and PX-200. For the polycarbonate compositions using BDP or PX-200 or any other phosphorus flame retardant agents, in order to improve the FR performance, the loading of flame retardant agents must be increased, which will lead to the decrease of the heat resistance (i.e. VICAT). Surprisingly, the polycarbonate composition according to the present invention provides a new solution to improve flame retardant and heat resistance simultaneously.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A flame retardant impact-modified polycarbonate composition comprising, relative to the total weight of the polycarbonate composition:
   A) 50-90 wt. % of at least one aromatic polycarbonates,
   B) 3-15 wt. % of at least one rubber-modified vinyl (co)polymer,
   C) 5-17 wt. % of a flame retardant combination of i) a DiDOPO compound and ii) a monomeric and/or oligomeric phosphoric and/or phosphonic acid ester, wherein the DiDOPO compound represents from 10 wt. % to 90 wt. % of the flame retardant combination, wherein the DiDOPO compound is selected from the compounds of formula (IV):

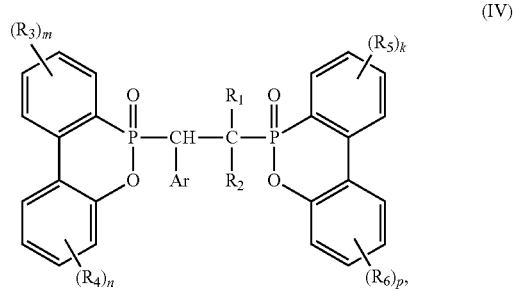

(IV)

wherein
Ar denotes $C_3$-$C_{18}$ heteroaryl or $C_6$-$C_{18}$ aryl;
$R_1$ and $R_2$, independently of one another, denote hydrogen, $C_1$-$C_{18}$ alkyl, $C_3$-$C_{18}$ heteroaryl or $C_6$-$C_{18}$ aryl;
$R_3$, $R_4$, $R_5$ and $R_6$, independently of one another, denote hydrogen, $C_1$-$C_{18}$ alkyl, $C_3$-$C_{18}$ heteroaryl or $C_6$-$C_{18}$ aryl;
m, n, k, and p individually selectable from 0, 1, 2, 3, 4;
any hydrogen atom on the aryl or heteroaryl aromatic ring can be independently replaced by any $C_1$-$C_{18}$ alkyl group.

2. The polycarbonate composition according to claim 1, wherein the rubber-modified vinyl (co)polymer comprises
B1) 5 to 95 wt. %, of at least one vinyl monomer on
B2) 95 to 5 wt. %, of one or more graft bases having a glass transition temperature of <10° C.,
the wt. % is calculated based on the weight of the rubber-modified vinyl (co)polymer.

3. The polycarbonate composition according to claim 2, wherein the at least one vinyl monomer B1 is a mixture of
B1.1) 50 to 99 wt. %, of vinylaromatics and/or vinylaromatics substituted on the nucleus and/or methacrylic acid ($C_1$-$C_8$)-alkyl esters and
B1.2) 1 to 50 wt. %, of vinyl cyanides (unsaturated nitriles, and/or (meth)acrylic acid ($C_1$-$C_8$)-alkyl esters, and/or derivatives of unsaturated carboxylic acids,
the wt. % is calculated based on the weight of the vinyl monomer B1;
and/or
the graft base B2 is chosen from diene rubbers, or mixtures of diene rubbers or copolymers of diene rubbers or mixtures thereof with further copolymerizable monomer, with the proviso that the glass transition temperature of component B2 is below <10° C.

4. The polycarbonate composition according to claim 1, wherein the monomeric and/or oligomeric phosphoric and/or phosphonic acid ester is selected from compounds of formula (V)

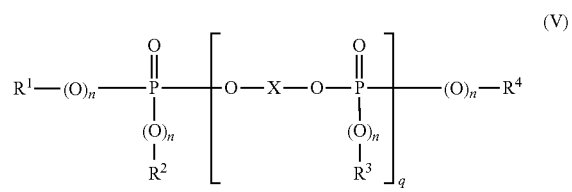

wherein
$R^1$, $R^2$, $R^3$ and $R^4$, independently of one another, denote $C_1$-$C_8$ alkyl, $C_5$-$C_6$ cycloalkyl, $C_6$-$C_{20}$ aryl or $C_7$-$C_{12}$ aralkyl each optionally substituted by alkyl,
n independently of one another, denotes 0 or 1,
q denotes a number ranging from 0 to 30, and
X denotes a mononuclear or polynuclear aromatic residue with 6 to 30 C atoms or a linear or branched aliphatic residue with 2 to 30 C atoms, which optionally being OH-substituted and containing up to eight ether bonds.

5. The polycarbonate composition according to claim 1, further comprising D) a rubber-free vinyl copolymer made of
D1) from 65 to 85% by weight, based on the rubber-free vinyl copolymer, of at least one monomer selected from the group of the vinyl aromatics and ring-substituted vinyl aromatics, and
D2) from 15 to 35% by weight, based on the rubber-free vinyl copolymer, of at least one monomer selected from the group of the vinyl cyanides, ($C_1$-$C_8$)-alkyl (meth) acrylates, unsaturated carboxylic acids and derivatives of unsaturated carboxylic acids.

6. The polycarbonate composition according to claim 1, wherein the total amount of the rubber-modified vinyl (co) polymer and rubber-free vinyl copolymer is from 5 wt. % to 10 wt. %, the total amount of the flame retardant combination of i) a DiDOPO compound and ii) a monomeric and/or oligomeric phosphoric and/or phosphonic acid ester ranges from 4 wt. % to 9 wt. %, relative to the total weight of the polycarbonate composition, wherein the DiDOPO compound represents 20 wt. % to 80 wt. % of the flame retardant combination.

7. The polycarbonate composition according to claim 1, wherein the total amount of the rubber-modified vinyl (co) polymer and rubber-free vinyl copolymer is from 10 wt. % to 15 wt. %, the total amount of the flame retardant combination of i) a DiDOPO compound and ii) a monomeric and/or oligomeric phosphoric and/or phosphonic acid ester ranges from 9 wt. % to 14 wt. %, relative to the total weight of the polycarbonate composition, wherein the DiDOPO compound represents 10 wt. % to 60 wt. % of the flame retardant combination.

8. The polycarbonate composition according to claim 1, further comprising one or more additive selected from antidripping agents, internal and external lubricants, mould release agents, flowability auxiliary agents, antistatic agents, conductivity additives, stabilizers, additives for improving scratch resistance, IR absorbents, optical brighteners, fluorescent additives, and dyestuffs and pigments.

9. A shaped article made from the polycarbonate composition according to claim 1.

10. The shaped article according to claim 9, wherein the shaped article is a part for adaptor, charger, projector, network device, TV, or notebook.

11. A method for preparing a shaped article comprising injection moulding, extrusion moulding, blowing moulding process or thermoforming a polycarbonate composition according to claim 1.

* * * * *